US005690701A

United States Patent [19]
Bigini et al.

[11] Patent Number: 5,690,701
[45] Date of Patent: Nov. 25, 1997

[54] PROCESS FOR THE MANUFACTURE OF PARTICLES OF COATED PERSALTS

[75] Inventors: Stefano Bigini, Terni; Romano Pardini, Rosignano-Solvay; Soraya Parvaneh, Leghorn, all of Italy

[73] Assignee: SOLVAY Interox (Société Anonyme), Brussels, Belgium

[21] Appl. No.: 531,950

[22] Filed: Sep. 21, 1995

[30] Foreign Application Priority Data

Sep. 22, 1994 [IT] Italy .................................. MI94A1927

[51] Int. Cl.$^6$ ............................ C01B 31/24; C01B 15/10
[52] U.S. Cl. .............. 23/302 R; 23/302 T; 252/186.27; 252/186.32; 423/265; 423/415.2
[58] Field of Search ................... 423/415.2, 265; 23/302 R, 302 T; 252/186.27, 186.32, 186.3

[56] References Cited

U.S. PATENT DOCUMENTS

| | | | |
|---|---|---|---|
| 4,025,609 | 5/1977 | Matsunaga | 423/415.2 |
| 4,117,087 | 9/1978 | Dillenburg et al. | 423/415.2 |
| 5,294,427 | 3/1994 | Sasaki et al. | 423/415.2 |
| 5,346,680 | 9/1994 | Roesler et al. | 423/415.2 |

FOREIGN PATENT DOCUMENTS

| | | |
|---|---|---|
| 0459625 | 12/1991 | European Pat. Off. . |
| 0487256 | 5/1992 | European Pat. Off. . |
| 0592969 | 4/1994 | European Pat. Off. . |
| 60-96511 | 5/1985 | Japan ........................ 423/415.2 |
| 1553505 | 9/1979 | United Kingdom . |

OTHER PUBLICATIONS

R.H. Perry: "Perry's Chemical Engineer's Handbook". Sixth Edition, 1985, McGraw-Hill, New York, pp. 19–24 to 19–40.

Primary Examiner—Gary P. Straub
Attorney, Agent, or Firm—Spencer & Frank

[57] ABSTRACT

Continuous process for the manufacture of solid alkali metal persalt particles coated by crystallization of a supersaturated aqueous solution of persalts and covering of the persalt particles in a post-crystallization vessel into which at least one coating agent is introduced and in which crystallization of the coating agent around the persalt particles is carried out under controlled temperature and stirring conditions.

10 Claims, No Drawings

PROCESS FOR THE MANUFACTURE OF PARTICLES OF COATED PERSALTS

FIELD OF THE INVENTION

The invention relates to a process for the manufacture of solid particles of coated persalts.

The solid particles of coated persalts obtained by the process are used in various types of industry as an active oxygen vehicle in the solid state and in particular in the detergents industry.

TECHNOLOGY REVIEW

Processes for the manufacture of coated percarbonates by evaporation of a solution of the coating composition on the solid persalt particles and subsequent drying of the coated product have been known for a long time (EP-A1-459,625).

Another known technique consists in mixing the percarbonate, which has been dried beforehand, in a mixer with an aqueous solution of the coating agent (borate) and in subsequently drying the mixture obtained (EP-0,487,256).

These known processes, however, have the disadvantage of requiring a complex industrial installation comprising a coating shop which contains, in addition to the mixer or the evaporator, its own drying units, which are independent of the drying units for the noncoated persalt.

The invention overcomes the disadvantages of the known processes by providing a process which makes it possible to obtain, under economic conditions, stable persalt particles with a narrow particle size distribution by means of a continuous process which does not require complex industrial installations containing a number of drying units.

To this end, the invention relates to a continuous process for the manufacture of solid particles of at least one persalt of at least one alkali metal coated by covering the persalt with a coating composition, according to which, in a first stage, a supersaturated aqueous persalt solution is continuously crystallized by any known technique, the crystalline particles obtained are subjected, in a final stage, to centrifuging and to drying, a coating stage, in which a suspension of the persalt particles arising from the crystallization stage is transferred into a stirred vessel, known as the post-crystallization vessel, is inserted between the crystallization stage and the centrifuging stage, at least one coating agent is introduced into the said post-crystallization vessel and a crystallization of the said coating agent at the surface of the persalt particles is carried out under controlled temperature and stirring conditions.

Persalt is understood to denote any inorganic compound which is solid under normal temperature and pressure conditions and which releases, when dissolved in water, hydrogen peroxide and a salt of an inorganic acid. Examples of persalts in accordance with the process according to the invention are perborates, phosphate peroxohydrates and carbonate peroxohydrates.

SUMMARY OF THE INVENTION

The process in accordance with the invention applies in particular to the manufacture of solid particles of coated alkali metal perborates or carbonate peroxohydrates. It has given excellent results in the manufacture of coated alkali metal carbonate peroxohydrates.

The process can be applied to the manufacture of coated persalts of any alkali metal. It is highly suitable for the manufacture of coated persalts of sodium or of potassium. It has given excellent results in the manufacture of coated persalts of sodium.

DETAILED DESCRIPTION OF THE INVENTION

The process according to the invention is very especially suitable for the manufacture of the coated sodium carbonate peroxohydrate, of formula $2Na_2CO_3.3H_2O_2$, commonly known as sodium percarbonate.

The process can also be used for the manufacture of a mixture of a number of coated persalts, for example of a mixture of coated alkali metal perborate and of coated alkali metal carbonate peroxohydrate. It can also be used for the manufacture of a mixture of coated persalts of different alkali metals, such as, for example, of coated persalts of sodium and of potassium.

Coating composition is understood to denote a composition capable of being used for coating persalt particles, that is to say covering them with as uniform a layer as possible of a composition which isolates them from the outer world.

According to the invention, the process is carried out in a number of stages. In a first stage, the persalt particles are prepared by continuous crystallization of a supersaturated aqueous solution of the said persalt. This crystallization stage can be carried out in the most varied types of crystallizers. The crystallizers traditionally used in the chemical and pharmaceutical industry are generally highly suitable. Examples of such crystallizers are given in the work by Perry H. and Green D. W. "Perry's Chemical Engineers' Handbook" 6th Edition, McGraw-Hill, New York, 1984, pages 19–24 to 19–40.

It is also possible, as a variant, to use crystallizers-classifiers, that is to say crystallizers which also carry out classification of the particles formed in order to reduce the spread in their particle size distribution.

According to the invention, the persalt particles are, in a final stage, subjected to centrifuging in order to remove, by draining, the major part of the crystallization mother liquors. This operation is carried out in industrial centrifuges of the standard type employed in the chemical and pharmaceutical industry.

The centrifuged particles are then dried in appropriate equipment. Any type of industrial dryer compatible with the drying of the persalt particles under conditions suitable for maintaining the stability of the active oxygen which they contain can be employed. Among the dryers which are suitable, hot air dryers are generally satisfactory. Fluidized bed dryers of particles in a stream of hot air give good results.

According to the invention, the coating stage for the persalt particles is inserted between the crystallization and centrifuging stages.

In accordance with the invention, coating of the persalt particles is carried out by transferring the suspension of particles leaving the crystallizer into a stirred vessel in which an additional crystallization, known as "post-crystallization", of the coating composition around the persalt particles is carried out.

Stirred vessel is understood to denote a vessel equipped with a stirrer capable of homogenizing the aqueous suspension of the persalt particles. All types of stirrers can be envisaged without distinction, provided that they do not produce an excessively large shear force which would result in break-up of the persalt particles. In practice, rotary stirrers have been satisfactory. Among the latter, rotary stirrers with paddles securely attached to a central shaft driven by a motor, the speed of which can be adjusted, have proved to be highly suitable.

According to the invention, at least one coating agent is introduced into the post-crystallization vessel. The coating agent can without distinction be introduced in the form of a concentrated aqueous solution or in the form of solid particles.

Concentrated solution is understood to denote a solution which is slightly supersaturated under the temperature and pressure conditions prevailing in the post-crystallization vessel.

According to the invention, it is possible to use coating agents of various types. Coating agents used to date for coating persalts can be used in the process in accordance with the invention. It is also possible to use a mixture of a number of different coating agents.

Advantageously, an alkali metal salt of at least one inorganic acid can be used as coating agent.

The inorganic acids will preferably be selected from strong acids. Hydrochloric and sulphuric acids have given excellent results, in particular for the salts sodium chloride and sodium sulphate.

Other advantageous inorganic acids are carbonic, tetraboric and silicic acids, in particular for the salts sodium carbonate, borax and sodium silicate.

The coating agents can, according to the invention, be introduced separately into the post-crystallization vessel. They can also, as a variant, be introduced into the post-crystallization vessel as a mixture with the suspension of the persalt particles. According to this variant, the coating agents can originate from the crystallization vessel.

Another advantageous variant is to use, as coating agent, the salting-out agent which may be present in the crystallization mother liquors of the suspension of persalt particles which enter into the post-crystallization vessel. The crystallization mother liquors contain in particular such a salting-out agent when the crystallization has been carried out by the technique of precipitation with the help of the addition of a common ion (salting-out technique).

The temperature and the pressure of the post-crystallization stage must be adapted so that the aqueous solution becomes slightly supersaturated with respect to the coating agent.

The operation is generally carried out, for reasons of convenience, at atmospheric pressure.

An advantageous embodiment of the process according to the invention consists in supplying the post-crystallization vessel with an aqueous solution of the coating agent, the concentration of which is close to saturation at a temperature greater by one to two °C. than that which prevails in the post-crystallization vessel, and in continuously removing heat from the post-crystallization vessel so as to supersaturate the solution at the controlled temperature of the said vessel.

According to a first variant of the invention, the temperature of the post-crystallization vessel is selected to be identical to that which prevails in the crystallizer arranged upstream.

According to a second variant of the invention, the temperature of the post-crystallization vessel is adjusted to a value below that which prevails in the crystallizer arranged upstream.

Preferably, the temperature of the post-crystallization vessel is adjusted to a value at least 5° C. below that prevailing in the crystallizer. In a particularly preferred way, the temperature of the post-crystallization vessel is adjusted to a value at least 10° C. below that prevailing in the crystallizer.

The post-crystallization vessel in accordance with the process according to the invention generally contains a device capable of cooling the aqueous solution which is present in the vessel. Any device known for exchanging heat in chemical reactors is suitable. It is possible, for example, to equip the vessel with a coil which is immersed in the aqueous solution and through which flows a cold fluid whose role is to harness the heat of the vessel. It is also possible, as a variant, to equip the vessel with a double wall in which the cold fluid circulates.

It is possible to use, as cold fluid, the liquid coolants used in the refrigeration industry or a cooled brine. Good results have been obtained with a cooled NaCl brine.

When use is made of a coating agent introduced separately into the post-crystallization vessel, it is possible, if necessary, to cool the said vessel to a temperature below that of the crystallization vessel, in order to search for optimum conditions for precipitation of the coating agents around the persalt particles.

When the nature of the coating agents allows it, it is sometimes possible, nevertheless, to operate in the post-crystallization vessel at the same temperature as in the crystallization vessel.

On the other hand, when use is made, as coating agent, of the salting-out agent present in the mother liquors which accompany the persalt particles, it is generally advisable to operate at a temperature which is lower than that of the crystallization vessel, in order to promote precipitation of the said coating agent around the persalt particles.

EXAMPLES

The examples which follow are given with the aim of illustrating the invention, without in any way limiting the scope thereof.

In all these examples, a value of the stability of the persalt in a detergent base is mentioned. This measurement consisted in dry-mixing a proportion of 10 weight % of the tested persalt with 90 weight % of a base detergent powder which analysed as follows:

Anionic detergents, g/kg . . . 199
Carbonate, g/kg . . . 97.3
Soluble B compounds, g B/kg . . . <0.03
Soluble Si compounds, g Si/kg . . . 10
Soluble S compounds, g S/kg . . . 55
Soluble P compounds, g P/kg . . . 2.8
Nonionic detergents, g/kg . . . 22
Nonanoyloxybenzenesulphonate, g/kg . . . 13
Sulphate, g $SO_4$/kg . . . 143

The mixture obtained had an active oxygen assay in the region of 1.5% (determined by iodometry).

A number of samples of each mixture to be tested were then introduced into wax-laminated cardboard boxes with a capacity of approximately 120 ml. The boxes were approximately half-filled with 50 g of mixture. Each box was sealed and stored in a thermostatically-controlled environment at 32° C. where a relative humidity of 80% prevailed.

The residual active oxygen was then determined in terms of various storage periods. The stability values mentioned later correspond to the residual active oxygen content expressed as mole % of the initial content at the beginning of storage.

Example 1R

(not in accordance with the invention)

Sodium carbonate peroxohydrate (SPC or sodium "percarbonate", $2Na_2CO_3 \cdot 3H_2O_2$) was manufactured in a crystallizer-classifier from a hydrogen peroxide solution containing crystallization adjuvants and from a sodium carbonate solution containing stabilizers and a salting-out agent, under the following operating conditions:

| Parameters | Operating conditions |
|---|---|
| Crystallization temperature, °C. | 30 |
| Concentration of the $H_2O_2$ solution, g $H_2O_2$ /100 g solution | 32 |
| Concentration of the $Na_2CO_3$ solution, g $Na_2CO_3$ /100 g solution | 25 |
| Salting-out agent: | |
| Nature | $Na_2SO_4$ |
| Concentration, g/100 g solution | 9 |
| Stabilizers, g/kg $Na_2CO_3$: | |
| Sodium silicate | 40 |
| DEQUEST ® 2010 | 1.4 |
| Crystallization adjuvants, g/kg $Na_2CO_3$: | |
| Na polyacrylate | 2.6 |
| $Na_4P_2O_7$ | 7.5 |

The SPC obtained at the outlet of the crystallizer-classifier was then centrifuged in an industrial centrifuge from the firm KRAUSS-MAFFEI of HZ25 type with a pan volume of 2.5 dm³. Centrifuging of the SPC was carried out therein under semicontinuous conditions in the following way:

- entry of 1 to 1.5 l of SPC slurry (250–450 g of solid) and of mother liquors into the rotating pan (2,000 revolutions/min)
- centrifuging at 2,000 revolutions/min for 80 to 90 s
- reduction of the rotational speed of the pan to 400 revolutions/min
- cutting out the cake using a blade and discharging the SPC which has been centrifuged to a moisture content of 8–12 weight %
- increasing the rotational speed of the pan to 2,000 revolutions/min
- new filling, centrifuging and discharging cycle and so on.

The centrifuged SPC was then dried continuously (flow rate 6 to 8 kg/h) in a 1.4 dm³ cylindrical fluidized bed (diameter: 1.5 dm) through which passes a stream of hot air with a flow rate of 30 to 40 m³/h at 110°–120° C.

The temperature in the fluidized bed was 65°–70° C. and the mean residence time of the SPC was from 10 to 20 min.

The product obtained had the following characteristics:

| Parameters | Characteristics of the product |
|---|---|
| Active $O_2$, g/100 g | 14.4 |
| Apparent density, kg/l | 0.83 |
| Mean diameter, µm | 900 |
| Rate of dissolution, % | 94 |
| Stability in the detergent base, % | 60.4 |

The rate of dissolution was determined by the following method:

A stainless steel stirrer with 2 vertical paddles with a length of 42 mm and a height of 11 mm arranged at right angles is immersed in a volume of demineralized water of 1,000 ml maintained at 15° C.±1° C. in a 2 l beaker and the stirrer is rotated at the controlled rate of 350 revolutions/min±10 revolutions/min. 2 g±0.01 g of coated SPC sample are then introduced into the beaker and a stopwatch is immediately started at this precise instant. The conductivity of the solution is then recorded every minute for 5 minutes as well as the conductivity after stirring for 15 minutes. Moreover, a calibration curve is drawn by plotting the conductivity, measured after stirring for 15 minutes, of the following amounts of coated SPC: 1.0, 1.5, 2.0 and 2.5 g. On transferring the conductivity of the sample measured after 2 minutes to the calibration curve, the weight of dissolved SPC is deduced therefrom. The conventional rate of dissolution after stirring for 2 minutes is subsequently obtained by referring the weight of dissolved SPC to that of the total of the sample used and is expressed as %.

Examples 2 to 4

(in accordance with the invention)

A post-crystallization stage was inserted, in the manufacture of the sodium percarbonate described in Example 1R, between the crystallization stage and the centrifuging stage. The conditions of this post-crystallization stage were the following:

| Parameters | Example 2 | Example 3 | Example 4 |
|---|---|---|---|
| Coating agent introduced at the post-crystallization: | | | |
| NaCl, g/l | 110 | 130 | none |
| $Na_2CO_3$, g/l | 120 | — | none |
| Temperature, °C. | 10 | 20 | 5.00 |

The results of the examination of the coated products were the following:

| Parameters | Example 2 | Example 3 | Example 4 |
|---|---|---|---|
| Active $O_2$, g/100 g | 12.6 | 12.8 | 13.9 |
| $Na_2SO_4$ content, g/100 g | 9.8 | 8.6 | 7.2 |
| NaCl content, g/100 g | 2.3 | 3.3 | 0.0 |
| Apparent density, kg/l | 0.92 | 0.91 | 0.91 |
| Mean diameter, µm | 970 | 800 | 900 |
| Rate of dissolution, % | 81.0 | 80.3 | 88.0 |
| Stability in the detergent base, % | 70.4 | 77.1 | 77.7 |

What is claimed is:

1. A continuous process for the manufacture of coated particles of at least one persalt of at least one alkali metal, comprising:

(a) continuously crystallizing a supersaturated aqueous persalt solution in a crystallizer in order to obtain a suspension of crystalline persalt particles, (b) transferring the suspension of crystalline persalt particles leaving the crystallizer into a stirred post-crystallization vessel, (c) introducing at least one coating agent selected from the group consisting of alkali metal salts of at least one inorganic acid into the said vessel, at a concentration lower than saturation, (d) crystallizing said coating agent on the surface of the persalt particles in the post-crystallization vessel to obtain coated crystalline persalt particles, (e) centrifuging the coated crystalline particles in a centrifuge, and (f) drying the thus centrifuged coated crystalline persalt particles in a dryer.

2. The process according to claim 1 wherein the temperature in the coating stage (d) is below that in the crystallization stage.

3. The process according to claim 2, wherein the temperature in the coating stage (d) is at least 5° C. below that in the crystallization stage.

4. The process according to claim 1, wherein said coating agent is selected from alkali metal salts of at least one inorganic acid selected from the group consisting of carbonic acid, tetraboric acid, and silicic acid.

5. The process according to claim 1, wherein said coating agent is selected from alkali metal salts of at least one strong inorganic acid.

6. A process according to claim 5, wherein the strong acid is hydrochloric acid or sulphuric acid.

7. The process according to claim 1, including a salting-out agent in said crystallizer, the concentration of which is lower than saturation.

8. The process according to claim 7, wherein the suspension of crystalline persalt particles obtained from the crystallization stage and mother liquors containing the salting-out agent are cotransferred to the post-crystallization vessel.

9. The process according to claim 8, wherein the salting-out agent present in the mother liquors after the first stage and the coating agent are the same.

10. The process according to claim 1, wherein the coating agent is selected from the group consisting of alkali metal salts of hydrochloric, sulphuric, carbonic and tetraboric acids.

* * * * *